United States Patent
Tanaka et al.

(10) Patent No.: US 11,518,034 B2
(45) Date of Patent: Dec. 6, 2022

(54) MALFUNCTION DETERMINATION METHOD AND MALFUNCTION DETERMINATION DEVICE

(71) Applicant: Nissan Motor Co., Ltd., Kanagawa (JP)

(72) Inventors: Yasuhiro Tanaka, Kanagawa (JP); Toshimichi Urakawa, Kanagawa (JP); Toru Takagi, Kanagawa (JP); Minoru Tomikashi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 92 days.

(21) Appl. No.: 16/958,270

(22) PCT Filed: Dec. 26, 2017

(86) PCT No.: PCT/JP2017/046666
§ 371 (c)(1),
(2) Date: Jun. 26, 2020

(87) PCT Pub. No.: WO2019/130430
PCT Pub. Date: Jul. 4, 2019

(65) Prior Publication Data
US 2020/0331145 A1    Oct. 22, 2020

(51) Int. Cl.
*B25J 9/16*    (2006.01)
*B25J 9/12*    (2006.01)
*B25J 13/08*    (2006.01)

(52) U.S. Cl.
CPC ............. *B25J 9/1674* (2013.01); *B25J 9/12* (2013.01); *B25J 13/085* (2013.01); *B25J 13/087* (2013.01)

(58) Field of Classification Search
CPC . B25J 9/12; B25J 9/1674; B25J 13/085; B25J 13/087; B25J 19/06; G05B 19/4062; G05B 23/0245; G05B 2219/37435
See application file for complete search history.

(56) References Cited

U.S. PATENT DOCUMENTS 9,982,619 B2    5/2018 Mikawa
2006/0247888 A1*  11/2006 Kojima ................. B23Q 17/22
                                                          702/130

(Continued)

FOREIGN PATENT DOCUMENTS

DE    112016001030 T5    12/2017
JP    2002-175104 A    6/2002
JP    2007-219991 A    8/2007

*Primary Examiner* — Dale Moyer
(74) *Attorney, Agent, or Firm* — Osha Bergman Watanabe & Burton LLP

(57) ABSTRACT

A malfunction determination method for a production machine including a motor as a driving source of a rotating mechanism acquires sensor data of a sensor for detecting a condition of the production machine, determines whether the production machine has an operation stop period during which the production machine has stopped its operation for a predetermined period of time or longer in accordance with an operation history of the production machine, sets a malfunction determination suspension period for suspending a malfunction determination of the production machine when determined to have the operation stop period, in accordance with a length of the operation stop period, and determines whether the production machine has a malfunction in a period other than the malfunction determination suspension period.

8 Claims, 7 Drawing Sheets

(56) References Cited

U.S. PATENT DOCUMENTS

| | | | |
|---|---|---|---|
| 2007/0244609 A1* | 10/2007 | Kinoshita | G05B 19/4062 701/22 |
| 2009/0200978 A1* | 8/2009 | Kato | B25J 9/1674 318/566 |
| 2018/0051645 A1 | 2/2018 | Mikawa | |
| 2019/0099886 A1* | 4/2019 | Chattopadhyay | B25J 9/1674 |

* cited by examiner

| OPERATION STOP PERIOD | 6 HOURS | 2 DAYS | 10 DAYS | 20 DAYS OR LONGER |
|---|---|---|---|---|
| MALFUNCTION DETERMINATION SUSPENSION PERIOD | 1 HOUR | HALF DAY | 2 DAYS | 5 DAYS |

FIG. 6

| OPERATION STOP PERIOD | 6 HOURS | 2 DAYS | 10 DAYS | 20 DAYS OR LONGER |
|---|---|---|---|---|
| MALFUNCTION DETERMINATION SUSPENSION PERIOD (ENVIRONMENTAL TEMPERATURE OF 10°C) | 2 HOURS | 1 DAY | 5 DAYS | 10 DAYS |
| MALFUNCTION DETERMINATION SUSPENSION PERIOD (ENVIRONMENTAL TEMPERATURE OF 30°C) | 1 HOUR | HALF DAY | 2 DAYS | 5 DAYS |

MALFUNCTION DETERMINATION METHOD AND MALFUNCTION DETERMINATION DEVICE

TECHNICAL FIELD

The present invention relates to a malfunction determination method and a malfunction determination device for acquiring sensor data of a sensor that detects a condition of a production machine including a motor as a driving source of a rotating mechanism, so as to determine a malfunction of the production machine.

BACKGROUND ART

An abnormal load detection device is known that detects an abnormal load applied to a motor, as disclosed in Patent Document 1. The abnormal load detection device disclosed in Patent Document 1 determines that the current operation is in a normal state without detecting an abnormal load when a rotation speed of the motor falls below a reference speed, such as when the motor stops, starts rotating, or rotates at a low speed, since such a situation tends to lead to false detection of an abnormality.

CITATION LIST

Patent Literature

Patent Document 1: Japanese Unexamined Patent Application Publication No. 2007-219991

SUMMARY OF INVENTION

Technical Problem

The method disclosed in Patent Document 1 still has a problem of false detection in a production machine such as a production robot, which is sometimes determined to have a malfunction regardless of the operational condition of the motor, such as a rotation speed. For example, the production machine, which has stopped its operation for a long period of time but then starts the operation, may be wrongly determined to have a malfunction immediately after the start even though there is no malfunction in the production machine. The method disclosed in Patent Document 1 thus cannot avoid false detection of a malfunction in the production machine which has not been operated for a long period of time, since the operating state of the production machine has no relationship with the operational condition of the motor.

In view of the foregoing problem, the present invention provides a malfunction determination method and a malfunction determination device capable of preventing false detection of a malfunction of a production machine under circumstances having no relationship with an operational condition of a motor, such as when the production machine has stopped its operation for a long period of time.

Technical Solution

To solve the above conventional problem, a malfunction determination method and device according to an aspect of the present invention determines whether a production machine has an operation stop period during which the production machine has stopped its operation for a predetermined period of time or longer in accordance with an operation history of the production machine, sets a malfunction determination suspension period for suspending a malfunction determination of the production machine when determined to have the operation stop period, in accordance with a length of the operation stop period, and determines whether the production machine has a malfunction in a period other than the malfunction determination suspension period.

Advantageous Effects

The present invention can provide the malfunction determination method and device capable of preventing false detection of a malfunction of the production machine made under the circumstances having no relationship with an operational condition of a motor, such as when the production machine has stopped its operation for a long period of time.

BRIEF DESCRIPTION OF THE DRAWINGS

FIG. 6 is a diagram for explaining a method of setting a malfunction determination suspension period by the malfunction determination device according to the second embodiment of the present invention.

DESCRIPTION OF EMBODIMENTS

First Embodiment

Figure 1:
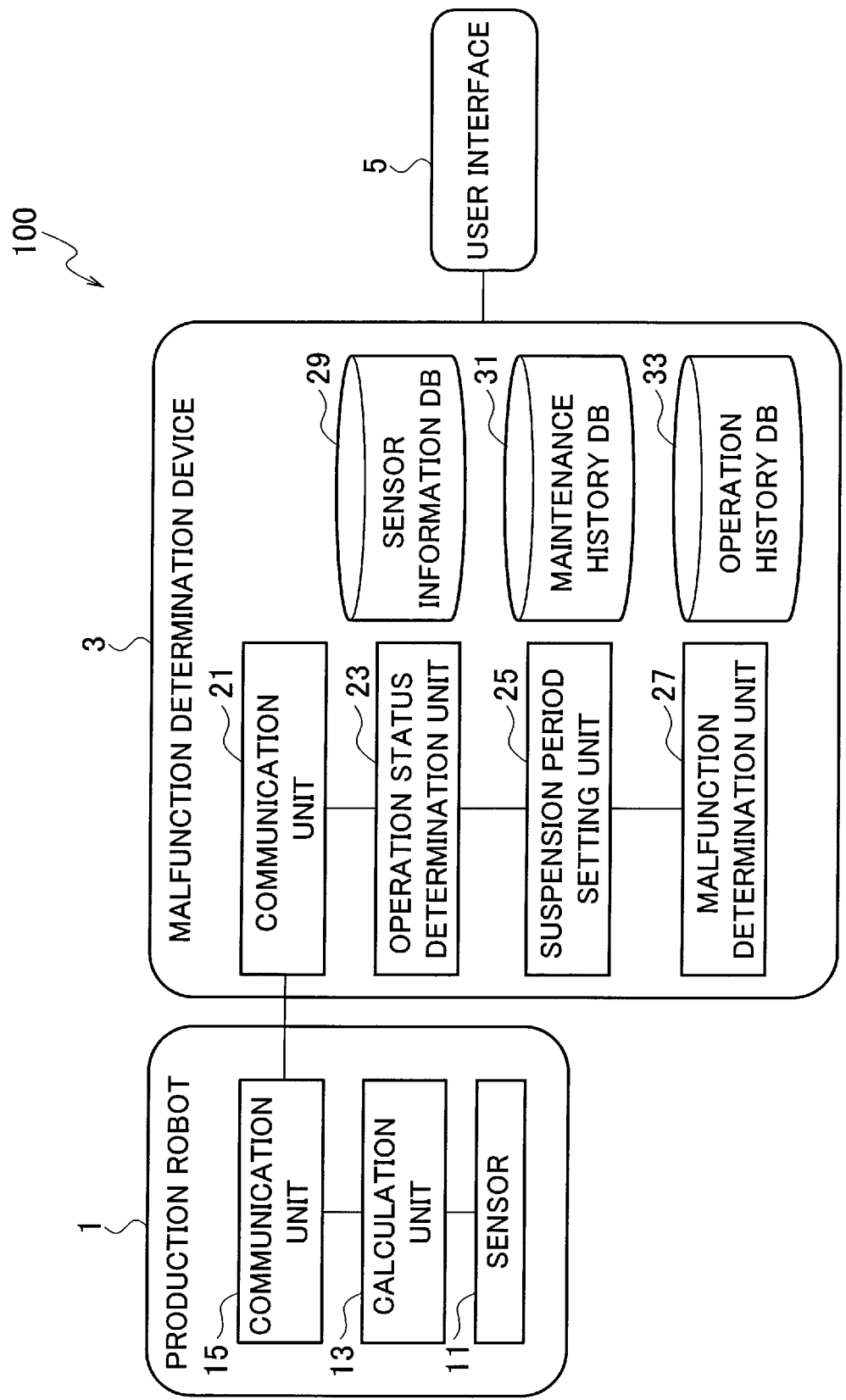
FIG. 1 is a block diagram illustrating a configuration of a malfunction determination system including a malfunction determination device according to a first embodiment of the present invention.

A first embodiment according to the present invention will be described below with reference to the drawings. The same elements illustrated in the drawings are indicated by the same reference numerals, and specific explanations are not repeated below.

Configuration of Malfunction Determination System

FIG. 1 is a block diagram illustrating a configuration of a malfunction determination system including a malfunction determination device according to the present embodiment. As shown in FIG. 1, the malfunction determination system 100 according to the present embodiment includes a production robot 1, a malfunction determination device 3, and a user interface 5.

The production robot 1 is a production machine including a plurality of motor drive systems as joint shafts. The motor drive systems include a motor as a driving source of a rotating mechanism of a robot arm, for example. The motor drives the robot arm via a reducer. The production robot 1 includes a sensor 11, a calculation unit 13, and a communication unit 15.

The sensor 11 detects a condition of the production robot 1 including various kinds of data on the motor drive systems necessary for determining a malfunction of the production robot 1. For example, the sensor 11 detects a rotational angle position, speed, and torque value of the motor, and a vibration value of the rotating mechanism such as the reducer. The calculation unit 13 obtains a difference between the torque value detected by the sensor 11 and a motor control value so as to calculate a disturbance torque value. The communication unit 15 has a function of communicating necessary data with the malfunction determination device 3 through a local area network (LAN), for example. In particular, the communication unit 15 transmits sensor data indicating the condition of the production robot 1. The sensor data includes the rotational angle position, speed, and torque value of the motor, the vibration value of the rotating mechanism, and the disturbance torque value.

The malfunction determination device 3 acquires the sensor data of the sensor 11 for detecting the condition of the production robot 1 so as to determine a malfunction of the production robot 1. The malfunction determination device 3 includes a communication unit 21, an operation status determination unit 23, a suspension period setting unit 25, a malfunction determination unit 27, a sensor information database 29, a maintenance history database 31, and an operation history database 33. The malfunction determination device 3 is implemented by a general-purpose electronic circuit including a microcomputer, a microprocessor, and a CPU, and a peripheral device including memory. The malfunction determination device 3 serves as the communication unit 21, the operation status determination unit 23, the suspension period setting unit 25, and the malfunction determination unit 27 when a predetermined program is executed. The respective functions of the malfunction determination device 3 can be implemented in single or plural processing circuits. The respective processing circuits include a programmed processing device, such as a processing device including an electric circuit, including an application-specific integrated circuit (ASIC) configured to execute the functions described in the embodiment or conventional circuit components.

The communication unit 21 has a function of communicating necessary data with the communication unit 15 of the production robot 1 through the LAN, for example. In particular, the communication unit 21 receives the sensor data indicating the condition of the production robot 1.

The operation status determination unit 23 determines whether the production robot 1 has an operation stop period during which the production robot 1 has stopped its operation for a predetermined period of time or longer, in accordance with the operation history of the production robot 1. In particular, the operation status determination unit 23 acquires an operation start time and date and an operation stop time and date of the production robot 1 from the operation history database 33 to calculate the operation stop period. The operation status determination unit 23 then compares the calculated operation stop period with a predetermined threshold so as to determine whether the production robot 1 has the operation stop period during which the production robot 1 has stopped the operation for a predetermined period or longer. For example, the operation status determination unit 23 determines whether there are operation stop periods of six hours or longer, two days or longer, ten days or longer, and twenty days or longer.

The suspension period setting unit 25 sets a malfunction determination suspension period during which the determination of a malfunction of the production robot 1 is suspended, in accordance with the length of the operation stop period when the production robot 1 is determined to have the operation stop period. The malfunction determination suspension period is set from a point at which the production robot 1 starts operating after the operation stop period ends. The determination of a malfunction of the production robot 1 by the malfunction determination unit 27 is suspended during the malfunction determination suspension period.

When a production machine has not been operated for a long period of time, viscosity of lubricating oil, for example, typically tends to increase. As a result, an abnormally large value could be output as a disturbance torque value when the production machine has not been operated for a long period of time but then starts operating, which may lead to false detection of a malfunction even though there is no malfunction in the production machine. The suspension period setting unit 25 thus sets the malfunction determination suspension period immediately after the operation stop period in accordance with the length of the operation stop period, so as to prevent false detection of a malfunction. Since the viscosity of lubricating oil is increased as the operation stop period is longer, the suspension period setting unit 25 sets the malfunction determination suspension period to be longer as the operation stop period is longer.

The malfunction determination unit 27 determines whether the production robot 1 has a malfunction by use of the sensor data indicating the condition of the production robot 1. In particular, the malfunction determination unit 27 acquires the sensor data during a predetermined period from the sensor information database 29 to determine whether the production robot 1 has a malfunction. The determination of a malfunction includes a process of calculating a malfunction determination value such as a difference rate of the disturbance torque to determine a malfunction of the production robot 1 depending on whether the malfunction determination value is a predetermined threshold or greater.

When the production robot 1 has a predetermined operation stop period or longer, the malfunction determination unit 27 determines whether the production robot 1 has a malfunction in a period other than the malfunction determination suspension period. Namely, the malfunction determination unit 27 determines whether the production robot 1 has a malfunction by use of the sensor data for a period other than the malfunction determination suspension period.

The sensor information database 29 accumulates the sensor data indicating the condition of the production robot 1. For example, the sensor information database 29 acquires and accumulates, through the respective communication units 15 and 21, data including the rotational angle position, speed, and torque value of the motor, and the vibration value of the rotating mechanism detected by the sensor 11, and data including the disturbance torque value calculated by the calculation unit 13.

The maintenance history database 31 accumulates maintenance history data of the production robot 1. For example, the maintenance history database 31 accumulates maintenance records including a date on which the reducer was replaced, and a time and date at which grease was reapplied.

The operation history database 33 accumulates operation history data including a time and date at which the production robot 1 started the operation and a time and date at which the production robot 1 stopped the operation.

The user interface 5 is a display device such as a monitor or a tablet device for displaying a determination result of a malfunction or an alert picture, or giving an alarm.

Malfunction Determination Processing

Figure 2:
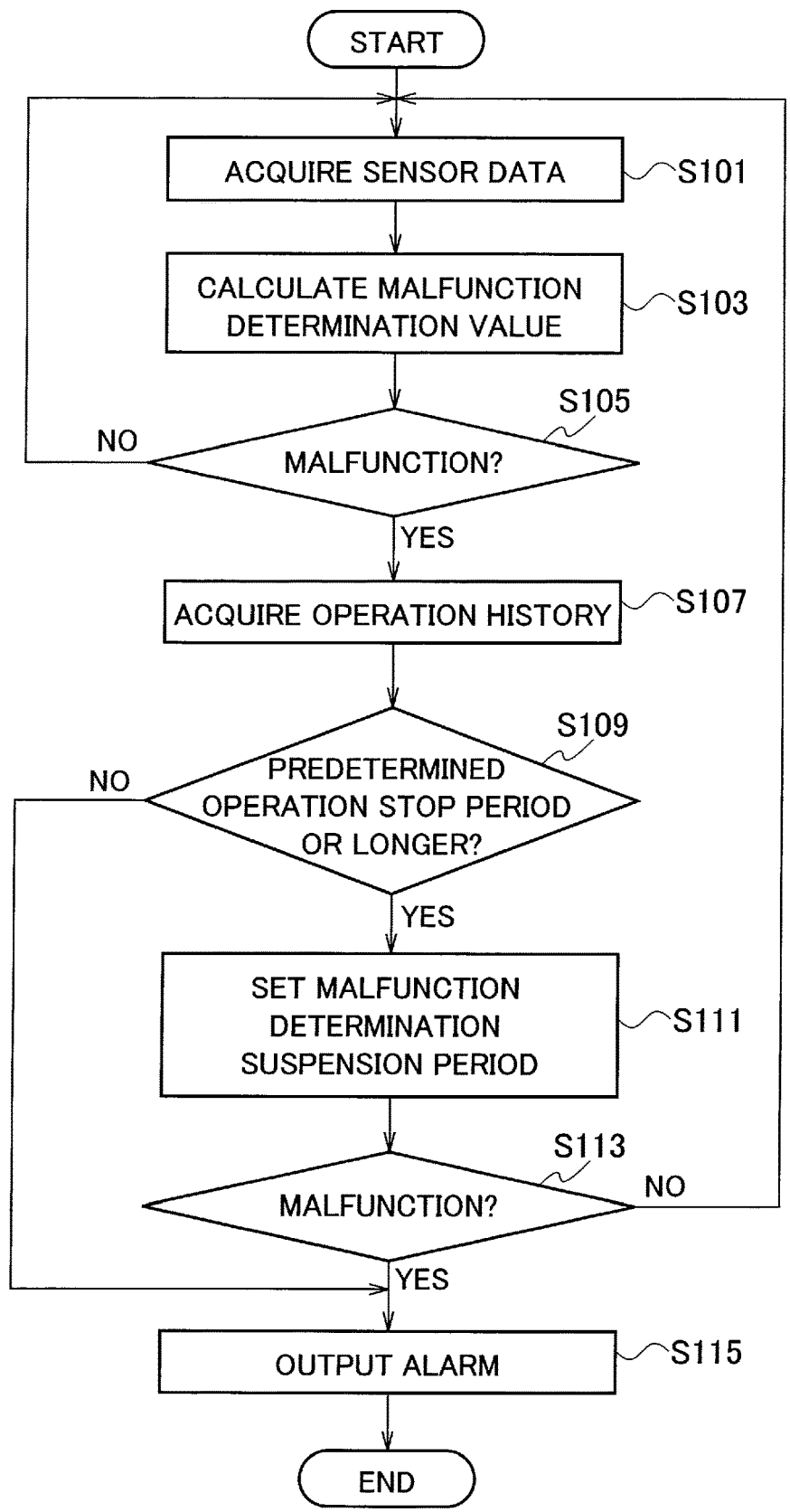
FIG. 2 is a flowchart illustrating a procedure of malfunction determination processing by the malfunction determination device according to the first embodiment of the present invention.

A malfunction determination method by the malfunction determination device 3 according to the present embodiment is described below with reference to FIG. 2. FIG. 2 is a flowchart illustrating a procedure of the malfunction determination processing by the malfunction determination device 3.

In step S101 shown in FIG. 2, the malfunction determination unit 27 acquires the sensor data accumulated in the sensor information database 29. In particular, the malfunction determination unit 27 acquires a piece of data for one of the periods preliminarily divided at regular intervals. The data to be acquired includes a disturbance torque and a vibration value of the rotating mechanism. The malfunction determination unit 27 also acquires the maintenance history data of the production robot 1 from the maintenance history database 31. The maintenance history to be acquired includes a date of replacement of the reducer and a time and date of grease reapplication. The malfunction determination unit 27 does not necessarily acquire the sensor data from the sensor information database 29, and may acquire the sensor data from the production robot 1 in real time.

In step S103, the malfunction determination unit 27 calculates the malfunction determination value by use of the sensor data. The malfunction determination value is a statistical value to be calculated for determining a malfunction of the production robot 1. For example, when the data of the disturbance torque is selected from the sensor data, the difference rate of the disturbance torque is used as the malfunction determination value. The difference rate of the vibration value of the rotating mechanism may also be used as the malfunction determination value. Any other statistical value such as an average value enabling the determination of a malfunction of the production robot 1 may be used instead of the difference rate.

The difference rate is a rate of change of a measurement value with respect to a predetermined reference value. The difference rate of the disturbance torque is given by the following equation (1) using a reference value:

$$\text{Difference rate} = (\text{disturbance torque measurement value} - \text{reference value})/\text{reference value} \quad (1)$$

The reference value may be an average value of disturbance torques in the same month of the previous year, for example. Any other value that can be a reference for determining a malfunction of the production robot 1 may be used as the reference value. For example, an average value of disturbance torques during the operation stop period may be used as the reference value when the production robot 1 is used in a region with no change in season or temperature.

Figures 3, 4:
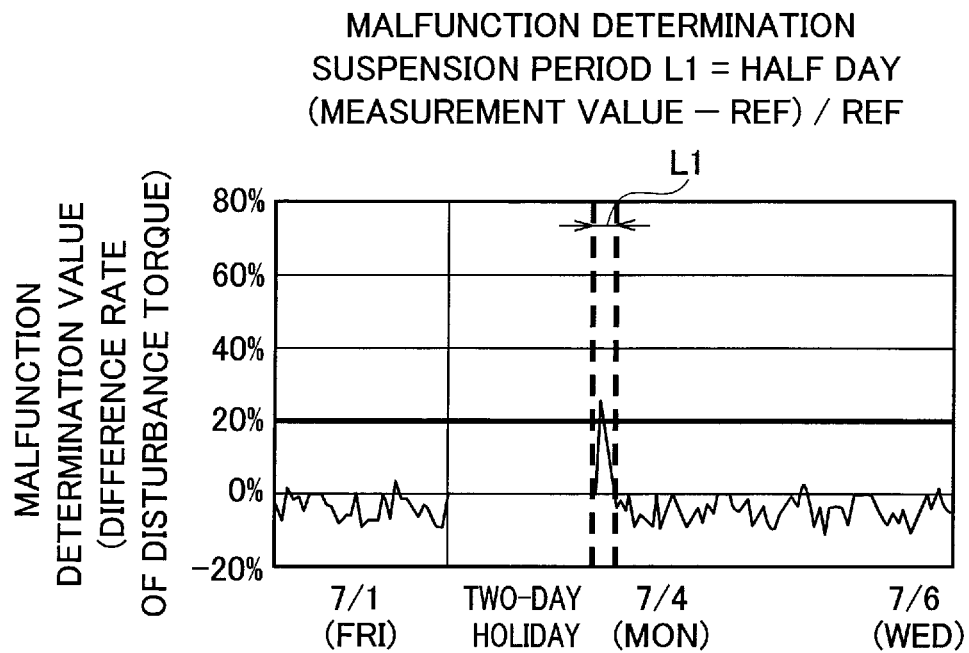
FIG. 3 is a diagram for explaining a malfunction determination method by the malfunction determination device according to the first embodiment of the present invention.
FIG. 4 is a diagram for explaining a method of setting a malfunction determination suspension period by the malfunction determination device according to the first embodiment of the present invention.

In step S105, the malfunction determination unit 27 compares the malfunction determination value with a predetermined threshold so as to determine whether the production robot 1 has a malfunction. For example, as shown in FIG. 3, when the difference rate of the disturbance torque is used as the malfunction determination value while the threshold is set to 20%, the production robot 1 is determined to have a malfunction when the difference rate of the disturbance torque is 20% or greater. The process proceeds to step S107 when there is a malfunction. The production robot 1 is determined to have no malfunction when the difference rate is less than 20%. The process returns to step S101 when there is no malfunction so as to acquire the sensor data for the period subsequent to the current malfunction determination to continuously execute the malfunction determination.

In step S107, the operation status determination unit 23 acquires the operation history data of the production robot 1 from the operation history database 33. The operation history data to be acquired includes the operation start time and date and the operation stop time and date of the production robot 1.

In step S109, the operation status determination unit 23 determines whether there is any operation stop period during which the production robot 1 has stopped its operation for a predetermined period of time or longer based on the acquired operation history data. In particular, the operation status determination unit 23 acquires the operation start time and date and the operation stop time and date of the production robot 1 from the operation history database 33 to calculate the operation stop period, and determines whether the operation stop period is a predetermined period or longer. Examples of predetermined periods to be set include six hours, two days, ten days, and twenty days. The operation status determination unit 23 thus determines that there is the operation stop period when the production robot 1 is determined to have stopped the operation for six hours or longer. The process proceeds to step S111 when the production robot 1 is determined to have the operation stop period. The process proceeds to step 115 when the production robot 1 is determined to have no operation stop period.

In step S111, the suspension period setting unit 25 sets the malfunction determination suspension period during which the determination of a malfunction of the production robot 1 is suspended, depending on the length of the operation stop period. As shown in FIG. 4, the suspension period setting unit 25 sets the malfunction determination suspension period to be one hour when the operation stop period is six hours or longer and shorter than two days. Similarly, the suspension period setting unit 25 sets the malfunction determination suspension period to be half a day when the operation stop period is two days or longer and shorter than ten days, sets the malfunction determination suspension period to be two days when the operation stop period is ten days or longer and shorter than twenty days, and sets the malfunction determination suspension period to be five days when the operation stop period is twenty days or longer. The suspension period setting unit 25 thus sets the malfunction determination suspension period to be longer as the operation stop period is longer. The length of the malfunction determination suspension period, however, should have an upper limit so as not to allow the malfunction determination suspension period to exceed the upper limit even if the operation stop period is further extended. For example, the malfunction determination suspension period still needs to be set to five days if the operation stop period exceeds one month.

The malfunction determination suspension period is set immediately after the operation stop period, namely, set from the point at which the production robot 1 starts operating after the operation stop period ends. FIG. 3 illustrates a case in which the operation stop period for two days ends, the malfunction determination suspension period L1 is set to half a day from the point at which the production robot 1 starts operating on July 4th.

In step S113, the malfunction determination unit 27 compares the malfunction determination value with the predetermined threshold in the period other than the malfunction determination suspension period so as to determine whether the production robot 1 has a malfunction. For example, the malfunction determination unit 27 determines whether the production robot 1 has a malfunction in the period other than the malfunction determination suspension period L1 set as shown in FIG. 3. In other words, the malfunction determination unit 27 determines whether the production robot 1 has a malfunction by use of the sensor data detected in the period other than the malfunction determination suspension period L1.

As shown in FIG. 3, the difference rate of the disturbance torque used as the malfunction determination value exceeds the threshold of 20% in the malfunction determination suspension period L1. The malfunction determination value does not exceed the threshold of 20% in the period other than the malfunction determination suspension period L1. The malfunction determination unit 27 thus determines that the production robot 1 has no malfunction. The process returns to step S101 when there is no malfunction, so as to acquire the sensor data for the period subsequent to the current malfunction determination to continuously execute the following malfunction determination. The process proceeds to step S115 when there is a malfunction.

When determining whether the production robot 1 has a malfunction, the malfunction determination unit 27 may analyze any other factor, in addition to the waveform of the malfunction determination value shown in FIG. 3, so as to determine a malfunction of the production robot 1 with the analysis result taken into consideration. For example, the malfunction determination unit 27 may execute the malfunction determination by use of another false-alarm avoidance logic, so as to determine a malfunction of the production robot 1 in accordance with the determination result.

In step S115, the malfunction determination unit 27 outputs an alarm via the user interface 5. For example, the malfunction determination unit 27 causes the user interface 5 to display the determination result of the malfunction or an alert picture on the display screen, or outputs an alarm sound. The malfunction determination unit 27 then stores the determination result of the malfunction and the output record of the alarm in the database, so that the malfunction determination processing by the malfunction determination device 3 according to the present embodiment ends.

Effects of First Embodiment

As described in detail above, the malfunction determination method and device according to the present embodiment determines whether the production machine has an operation stop period during which the production machine has stopped its operation for a predetermined period of time or longer in accordance with the operation history of the production machine. When the production machine is determined to have the operation stop period, the malfunction determination suspension period for suspending the malfunction determination of the production machine is set in accordance with the length of the operation stop period, and the production machine is then determined whether to have a malfunction in the period other than the malfunction determination suspension period. The malfunction determination method and device thus can prevent false detection of a malfunction made under the circumstances having no relationship with the operational condition of the motor, such as when the production machine has not been operated for a long period of time.

When a production machine has not been operated for a long period of time, viscosity of lubricating oil, for example, typically tends to increase. This may lead to false detection of a malfunction even though there is no malfunction in the production machine, when the production machine has not been operated for a long period of time and then starts operating. The malfunction determination method and device according to the present embodiment thus determines whether the production machine has a malfunction in the period other than the malfunction determination suspension period, so as to prevent false detection of a malfunction as described above. The prevention of false detection can decrease the number of maintenance steps necessary for the production machine, leading to a reduction in maintenance cost accordingly.

The malfunction determination method and device according to the present embodiment sets the reference value based on the past sensor data so as to determine a malfunction of the production machine depending on whether the rate of change of the sensor data with respect to the reference value is a predetermined threshold or greater. The production machine can be determined to have a malfunction when the production machine has been greatly changed from the past state, so as to make a determination of a malfunction of the production machine more precisely. The precise determination can prevent false detection of a malfunction of the production machine more accurately.

The malfunction determination method and device according to the present embodiment stores the sensor data in the database, and acquires the sensor data stored in the database so as to determine a malfunction of the production machine. This enables the malfunction determination at optional timing after all data necessary for the malfunction determination is prepared. The malfunction determination method and device thus can make a determination of a malfunction of the production machine more precisely, so as to prevent false detection of a malfunction of the production machine more accurately.

The malfunction determination method and device according to the present embodiment uses the data of the disturbance torque applied to the motor as the sensor data used for the malfunction determination of the production machine. The determination of a malfunction of the production machine is executed in accordance with the result of sensing of the motor itself, so as to make a determination of a malfunction of the production machine more precisely. The precise determination can prevent false detection of a malfunction of the production machine more accurately.

The malfunction determination method and device according to the present embodiment uses the data of the vibration value of the rotating mechanism as the sensor data used for the malfunction determination of the production machine. The determination of a malfunction of the production machine is executed in accordance with the result of sensing of the motor on the output side, so as to make a determination of a malfunction of the production machine more precisely. The precise determination can prevent false detection of a malfunction of the production machine more accurately.

Second Embodiment

A second embodiment according to the present invention will be described below with reference to the drawings. The same elements illustrated in the drawings as used in the first embodiment are indicated by the same reference numerals, and specific explanations are not repeated below.

Configuration of Malfunction Determination System

Figure 5:
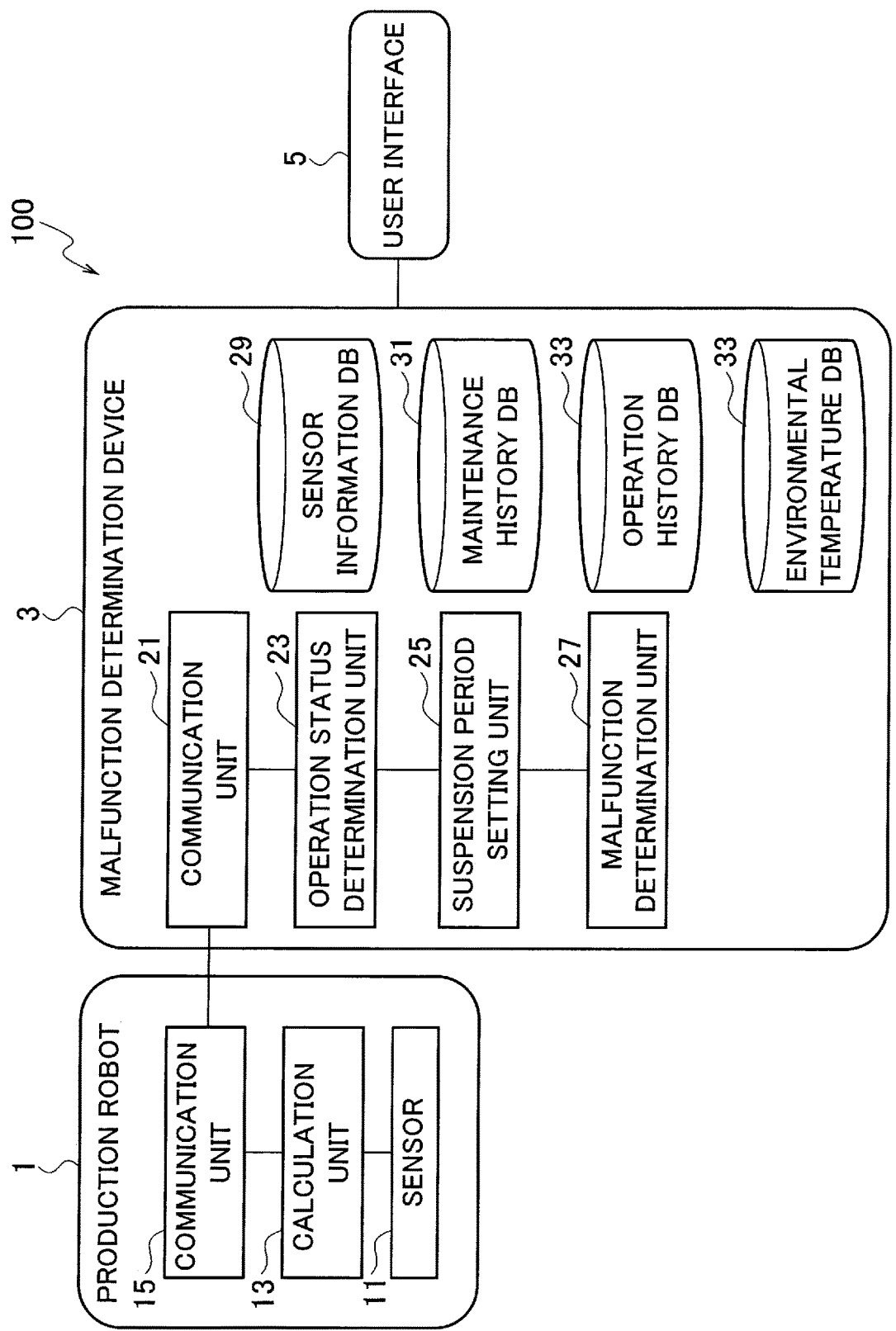
FIG. 5 is a block diagram illustrating a configuration of a malfunction determination system including a malfunction determination device according to a second embodiment of the present invention.

FIG. 5 is a block diagram illustrating a configuration of a malfunction determination system including a malfunction determination device according to the present embodiment. As shown in FIG. 5, the present embodiment differs from the first embodiment in that the malfunction determination device 3 further includes an environmental temperature database 51.

The environmental temperature database 51 accumulates environmental temperature data of the production robot 1. While the present embodiment exemplifies the environmental temperature data which refers to the temperature of the production robot 1, the data does not necessarily concern the temperature of the production robot 1, and may refer to the temperature of a facility in which the production robot 1 is installed. Alternatively, the temperature in an area in which the facility is located may be acquired externally, such as on the Internet, for example and accumulated.

When the production robot 1 has an operation stop period, the suspension period setting unit 25 sets a malfunction determination suspension period for suspending the malfunction determination of the production robot 1 in accordance with the length of the operation stop period and the environmental temperature of the production robot 1. While the first embodiment is illustrated with the case of setting the malfunction determination suspension period only based on the length of the operation stop period, the suspension period setting unit 25 according to the present embodiment sets the malfunction determination suspension period based on both the length of the operation stop period and the environmental temperature of the production robot 1. The environmental temperature of the production robot 1 used for setting the malfunction determination suspension period is an average temperature of the production robot 1 in the operation stop period. The environmental temperature may be any of the average temperature of the production robot 1, the average temperature in the facility, and the average temperature in the area in which the facility is located.

When a production machine has not been operated for a long period of time, viscosity of lubricating oil, for example, typically tends to be increased. The viscosity of the lubricating oil further increases as an environmental temperature is lower. If the production machine has been stopped for a long period of time at a low environmental temperature and then starts operating, a probability of false detection that the production machine is determined to have a malfunction is increased even though there is no malfunction in the production machine. The suspension period setting unit 25 thus sets the malfunction determination suspension period depending on the length of the operation stop period and the environmental temperature of the production machine. In particular, the suspension period setting unit 25 sets the malfunction determination suspension period to be longer as the operation stop period is longer, and sets the malfunction determination suspension period to be longer as the environmental temperature is lower.

As shown in FIG. 6, the malfunction determination suspension period is set to two hours when the operation stop period of the production robot 1 is six hours or longer and shorter than two days at the environmental temperature of 10° C., and set to one hour at the environmental temperature of 30° C. The malfunction determination suspension period is set to one day when the operation stop period of the production robot 1 is two days or longer and shorter than ten days at the environmental temperature of 10° C., and set to half a day at the environmental temperature of 30° C. The malfunction determination suspension period is set to five days when the operation stop period of the production robot 1 is ten days or longer and shorter than twenty days at the environmental temperature of 10° C., and set to two days at the environmental temperature of 30° C. The malfunction determination suspension period is set to ten days when the operation stop period of the production robot 1 is twenty days or longer at the environmental temperature of 10° C., and set to five days at the environmental temperature of 30° C. The suspension period setting unit 25 thus sets the malfunction determination suspension period to be longer as the operation stop period is longer, and sets the malfunction determination suspension period to be longer as the environmental temperature is lower.

Figure 7:
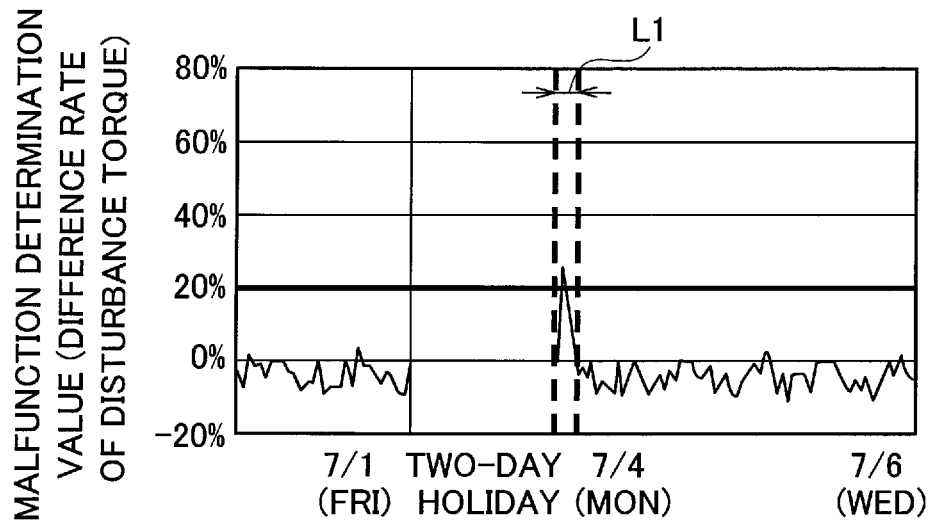
FIG. 7 is a diagram for explaining a malfunction determination method by the malfunction determination device according to the second embodiment of the present invention.
Figure 7:
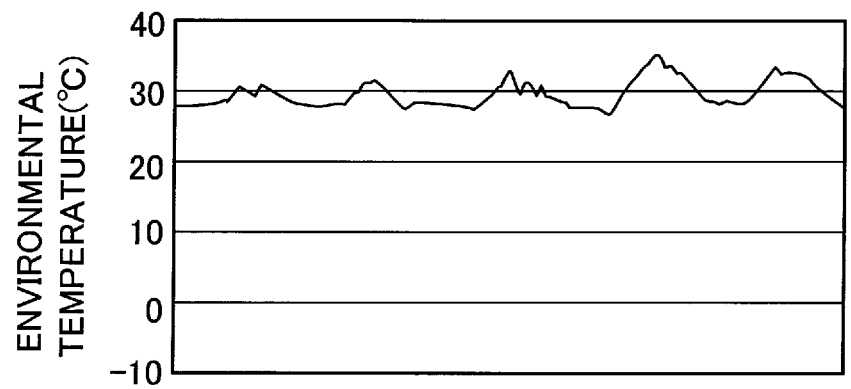
Figure 8:
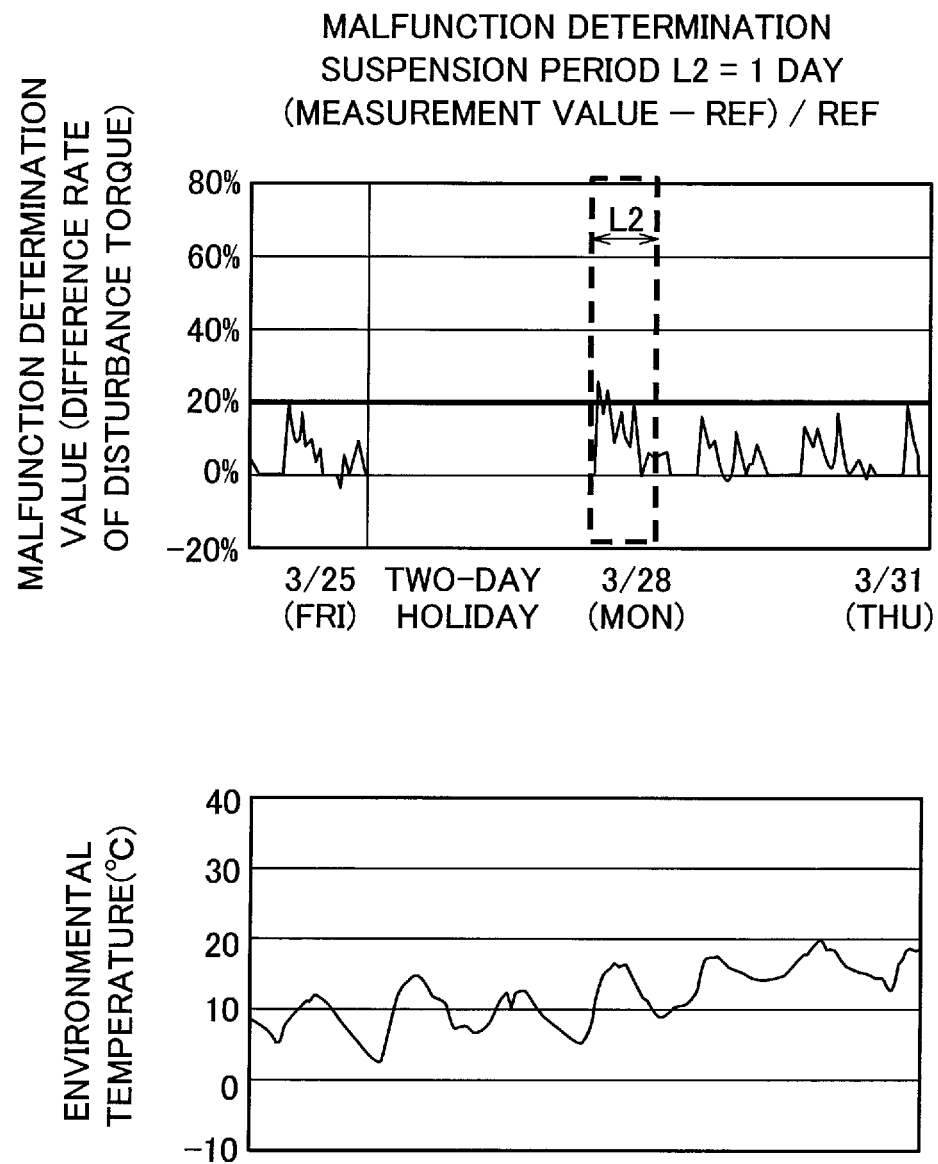
FIG. 8 is a diagram for explaining the malfunction determination method by the malfunction determination device according to the second embodiment of the present invention.

FIG. 7 illustrates a case of setting the malfunction determination suspension period L1 to half a day when the operation stop period is two days and the environmental temperature is around 30° C. FIG. 8 illustrates a case of setting the malfunction determination suspension period L2 to one day when the operation stop period is two days and the environmental temperature is around 10° C.

While FIG. 6 illustrates the case in which the malfunction determination suspension period differs depending on the environmental temperature of 10° C. or 30° C., the malfunction determination suspension period to be set may differ depending on the seasons, instead of the environmental temperature. For example, the malfunction determination suspension period to be set may differ between summer and winter, or may differ between spring, summer, fall, and winter.

Malfunction Determination Processing

A malfunction determination method by the malfunction determination device 3 according to the present embodiment is described below. The malfunction determination processing according to the present embodiment is similar to the malfunction determination processing according to the first embodiment as illustrated in FIG. 2. The operation status determination unit 23 according to the first embodiment only acquires the operation history data in step S107. According to the present embodiment, in step S107, the operation status determination unit 23 acquires the operation history data of the production robot 1 from the operation history database 33, and the suspension period setting unit 25 acquires the environmental temperature data of the production robot 1 from the environmental temperature database 51.

In step S111, the suspension period setting unit 25 sets the malfunction determination suspension period in accordance with the length of the operation stop period and the environmental temperature of the production machine, as described above. The other steps are the same as those in the first embodiment, and the malfunction determination processing by the malfunction determination device 3 thus ends.

Effects of Second Embodiment

As described in detail above, the malfunction determination method and device according to the present embodiment sets the malfunction determination suspension period in accordance with the length of the operation stop period and the environmental temperature of the production machine. This enables the setting of the malfunction determination suspension period with the influence by the temperature taken into consideration, so as to prevent false detection of a malfunction of the production machine more accurately.

The malfunction determination method and device according to the present embodiment uses the average temperature of the production machine in the operation stop period as the environmental temperature of the production machine. This enables the setting of the malfunction determination suspension period while reflecting the condition of the production machine in the operation stop period, so as to prevent false detection of a malfunction of the production machine more accurately.

The embodiments described above are examples of the present invention. It should be understood that the present invention is not intended to be limited to the above embodiments, and various modifications can be made, other than the above embodiments, depending on the design within the scope of the present invention.

REFERENCE SIGNS LIST

1 PRODUCTION ROBOT
3 MALFUNCTION DETERMINATION DEVICE
5 USER INTERFACE
11 SENSOR
13 CALCULATION UNIT
15, 21 COMMUNICATION UNIT
23 OPERATION STATUS DETERMINATION UNIT
25 SUSPENSION PERIOD SETTING UNIT
27 MALFUNCTION DETERMINATION UNIT
29 SENSOR INFORMATION DATABASE
31 MAINTENANCE HISTORY DATABASE
33 OPERATION HISTORY DATABASE
51 ENVIRONMENTAL TEMPERATURE DATABASE
100 MALFUNCTION DETERMINATION SYSTEM

The invention claimed is:

1. A malfunction determination method of a malfunction determination device for determining a malfunction of a production machine including a motor as a driving source of a rotating mechanism by acquiring sensor data of a sensor for detecting a condition of the production machine, the method comprising:
determining whether the production machine has an operation stop period during which the production machine has stopped its operation for a predetermined period of time or longer in accordance with an operation history of the production machine;
setting a malfunction determination suspension period for suspending a malfunction determination of the production machine when determined to have the operation stop period, in accordance with a length of the operation stop period; and
determining whether the production machine has a malfunction in a period other than the malfunction determination suspension period,
wherein the malfunction determination of the production machine is executed by setting a reference value based on past sensor data, and comparing the sensor data with the reference value.

2. The malfunction determination method according to claim 1,
wherein the malfunction determination suspension period is set in accordance with the length of the operation stop period and an environmental temperature of the production machine.

3. The malfunction determination method according to claim 2,
wherein the environmental temperature of the production machine is an average temperature of the production machine in the operation stop period.

4. The malfunction determination method according to claim 1,
wherein the malfunction determination of the production machine is executed by setting a reference value based on past sensor data, and determining whether a rate of change of the sensor data with respect to the reference value is a predetermined threshold or greater.

5. The malfunction determination method according to claim 1, further comprising storing the sensor data in a database, and acquiring the sensor data stored in the database so as to execute the malfunction determination of the production machine.

6. The malfunction determination method according to claim 1,
wherein the sensor data used for the malfunction determination of the production machine is data of a disturbance torque applied to the motor.

7. The malfunction determination method according to claim 1,
wherein the sensor data used for the malfunction determination of the production machine is data of a vibration value of the rotating mechanism.

8. A malfunction determination device for determining a malfunction of a production machine including a motor as a driving source of a rotating mechanism by acquiring sensor data of a sensor for detecting a condition of the production machine, the device being configured to:
determine whether the production machine has an operation stop period during which the production machine has stopped its operation for a predetermined period of time or longer in accordance with an operation history of the production machine;
set a malfunction determination suspension period for suspending a malfunction determination of the production machine when determined to have the operation stop period, in accordance with a length of the operation stop period; and
determine whether the production machine has a malfunction in a period other than the malfunction determination suspension period,
wherein the malfunction determination of the production machine is executed by setting a reference value based on past sensor data, and comparing the sensor data with the reference value.

* * * * *